(12) United States Patent
Vavro

(10) Patent No.: US 7,188,231 B2
(45) Date of Patent: Mar. 6, 2007

(54) MULTIMEDIA ADDRESS GENERATOR

(75) Inventor: David K. Vavro, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 473 days.

(21) Appl. No.: 10/611,286

(22) Filed: Jun. 30, 2003

(65) Prior Publication Data

US 2005/0010742 A1    Jan. 13, 2005

(51) Int. Cl.
   *G06F 12/10*   (2006.01)
(52) U.S. Cl. .................. 711/218; 711/220; 711/201
(58) Field of Classification Search ............... 711/218, 711/219, 220
   See application file for complete search history.

(56) References Cited

U.S. PATENT DOCUMENTS

| | | | |
|---|---|---|---|
| 5,867,723 A * | 2/1999 | Chin et al. ................... 712/11 |
| 6,088,046 A * | 7/2000 | Larson et al. ............... 345/538 |
| 6,138,262 A * | 10/2000 | Baek .......................... 714/768 |
| 6,195,737 B1 * | 2/2001 | Hollister et al. ............ 711/220 |
| 6,564,310 B2 * | 5/2003 | Nakata et al. .............. 711/202 |
| 2003/0088407 A1 * | 5/2003 | Hu et al. .................... 704/223 |
| 2003/0133333 A1 * | 7/2003 | Eldredge et al. ........... 365/200 |

* cited by examiner

*Primary Examiner*—Mano Padmanabhan
*Assistant Examiner*—Kaushik Patel
(74) *Attorney, Agent, or Firm*—Sharon Wong

(57) ABSTRACT

Embodiments of the invention provide an automatic address generator that generates an address sequence directly using counters that count between predefined start and stop values in accordance with a predefined modes of indexing. The counters support slipping when counting to support convolutional filters in one-dimension (1D) and two-dimension (2D). For 2D indexing, a first counter indexes in the X direction and a second counter indexes in the Y direction in memory. The values from the first and second counter are combined with an offset value to form an address directly to memory.

44 Claims, 6 Drawing Sheets

MULTIMEDIA ADDRESS GENERATOR

BACKGROUND

In digital image compression, various scanning requirements, some of which are complex, are imposed. For example, standards such as JPEG2000 have complex scanning requirements that require separate instructions to generate address sequence of reads. (See Information Technology—JPEG 2000 Image coding System—Part I: Core Coding System, ISO/IEC 15444-1:2000.) In particular, addresses are generated for load and store operations on data. Most signal processors compute the scanning address or have the address statically passed in with an instruction. This not only requires more instructions but also uses more power. Moreover, as the complexity of address generation is increased, simple incrementing counters become less or not effective.

DETAILED DESCRIPTION

Figure 1:
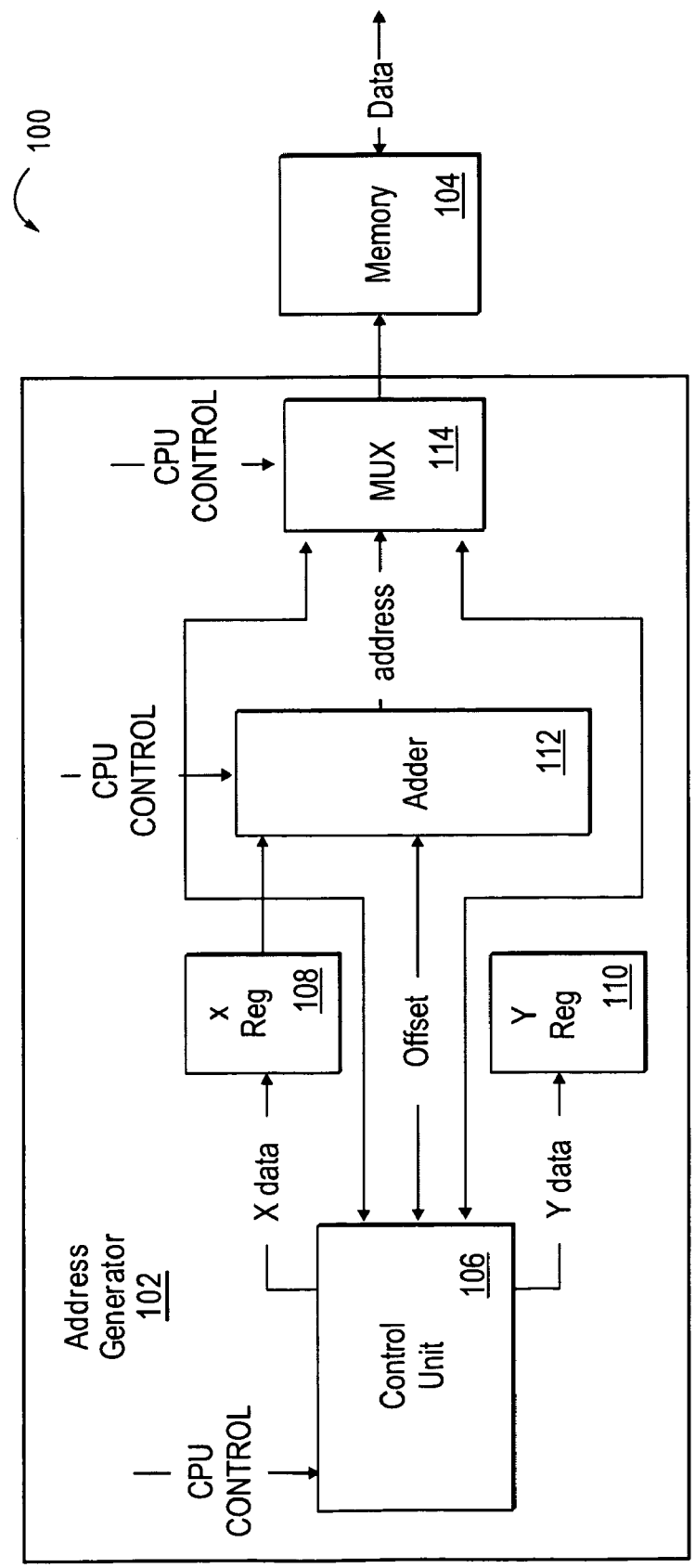
FIG. 1 illustrates a block diagram of an embodiment of an exemplary system embodying the invention.

Embodiments of the invention provide an automatic address generator that generates an address sequence directly using counters that count between predefined start and stop values in accordance with a predefined modes of indexing. The counters support slipping when counting to support convolutional filters in one-dimension (1D) and two-dimension (2D). For 2D indexing, a first counter indexes in the X direction and a second counter indexes in the Y direction in memory. The values from the first and second counter are combined with an offset value to form an address directly to memory. A signal processor can thus spend more time computing data than generating addresses for load and store operations on data. This speeds up the general signal processing of images and other signal processing applications when used in a processor or any memory reading or writing agent.

In the detailed description, numerous specific details are set forth in order to provide a thorough understanding of the present invention. However, it will be understood by those skilled in the art that the present invention may be practiced without these specific details. In other instances, well-known methods, procedures, components and circuits have been described in detail so as not to obscure the present invention.

Some portions of the detailed description that follow are presented in terms of algorithms and symbolic representations of operations on data bits or binary signals within a computer. These algorithmic descriptions and representations are the means used by those skilled in the data processing arts to convey the substance of their work to others skilled in the art. An algorithm is here, and generally, considered to be a self-consistent sequence of steps leading to a desired result. The steps include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities. Unless specifically stated otherwise as apparent from the following discussions, it is appreciated that throughout the specification, discussions utilizing such terms as processing or computing or calculating or determining or the like, refer to the action and processes of a computer or computing system, or similar electronic computing device, that manipulate and transform data represented as physical (electronic) quantities within the computing system s registers and/or memories into other data similarly represented as physical quantities within the computing system s memories, registers or other such information storage, transmission or display devices.

Embodiments of the present invention may be implemented in hardware or software (microcode), or a combination of both. However, embodiments of the invention may be implemented as computer programs executing on programmable systems comprising at least one processor, a data storage system (including volatile and non-volatile memory and/or storage elements), at least one input device, and at least one output device. Program code may be applied to input data to perform the functions described herein and generate output information. The output information may be applied to one or more output devices, in known fashion. For purposes of this application, a processing system includes any system that has a processor, such as, for example, a digital signal processor (DSP), a micro-controller, an application specific integrated circuit (ASIC), or a microprocessor.

FIG. 1 illustrates a block diagram of an embodiment of an exemplary system 100 embodying the invention. System 100 includes an address generator 102 and memory 104. The address generator 102 includes control unit 106, X register 108, Y register 110, adder 112 and multiplexer 114. Referring to FIG. 1, X and Y registers 108 and 110 store values received from the control unit 106. Outputs from X and Y registers 108 and 110 are applied to adder 112. The values from X and Y registers 108 and 110 are also applied back to control unit 106 which uses the values to determine subsequent values for output. Adder 112 combines values from X and Y counters 108 and 110 with an offset value to generate an address. The offset value is used to relocate code to a different area.

The address from adder 112 and values from X and Y registers 108 and 110 are applied as inputs to multiplexor 114. An instruction may be used to determine whether the address (x+y+offset), or x or y values should be selected for output by processor or other device. In the 1D mode, X or Y may be selected and used exclusively. The output from multiplexor 114 is an index/address to memory 104. In another embodiment, the processor reads the value generated without relying on data stored in memory. In particular, the address can be used as a coefficient with a sequence.

Figure 2:
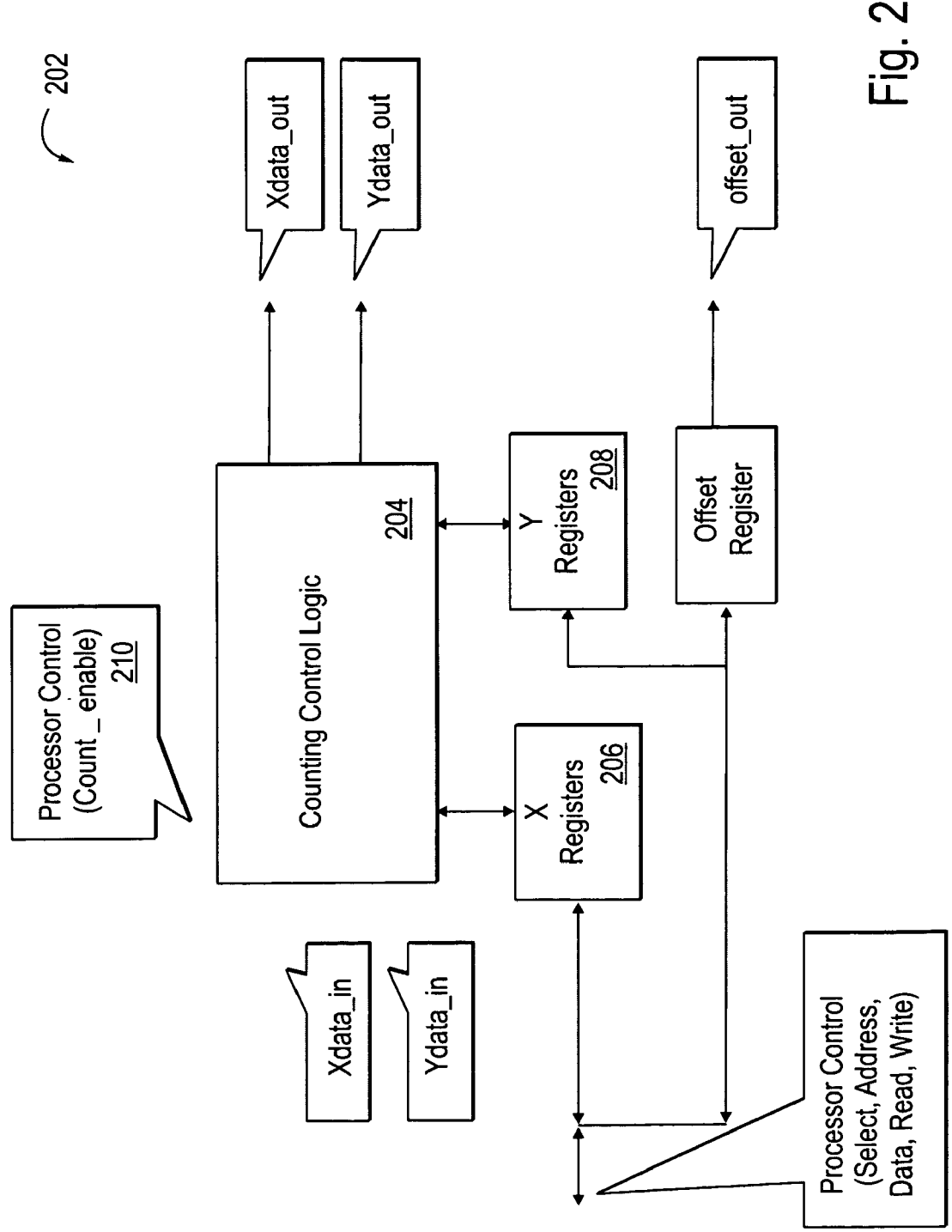
FIG. 2 illustrates a detailed block diagram of an embodiment of the control unit shown in FIG. 1.

FIG. 2 illustrates a detailed block diagram of an embodiment of the control unit shown in FIG. 1. Control unit 202 includes counting control logic 204 and X and Y registers 206 and 208, respectively. TABLE I describes the registers and how each parameter can effect the operation of the invention.

TABLE 1

Register and Mode Definitions

| Registers | Description of Effect on Counting Control Logic |
|---|---|
| Xstart | The start value of the counter X. This value is an unsigned number and able to take the range of for example, (0, 1, 2, 3, A). |
| Xstop | The stop value of the X counter. The counter will fold over to the Xstart value to finish the length count. This value is an unsigned number and able to take the range of for example (0, 1, 2, 3, B). The Xstop value does not have to be greater the Xstart value. |
| Xlength | The length or stride value that the X counter takes until it goes back to the last starting value plus the slip. This value is an unsigned number and able to take the range of for example (0, 1, 2, 3, C). |
| Xstep | The step value that the X counter counts by. This value is a signed number and able to take the range of for example (−M, −3, −2, −1, 0, 1, 2, 3, N). This allows the counter to increment, decrement, or no count. |
| Xslip | The slip value is used in both slip modes and allows the counter to slip positively, slip negatively, or no slip. This value is a signed number and able to take the range of for example (−J, −3, −2, −1, 0, 1, 2, 3, K). |
| Xslip_after_Xlength_mode | This mode uses the previous start value + slip to calculate the new start value after the X counter length has occurred. |
| Xslip_after_Ystop_mode | This mode allows the X slip register to be applied after Ystop is reached. This mode maybe useful for JPEG 2000 scanning. |
| Xcount_after_Ystop_mode | This mode allows the X counter to count when the Ystop value has been detected and after the Ylength count is finished. |
| Xcount_after_Ylength_mode | This mode allows the X counter to count when the Ylength count has occurred. |
| Ystart | The start value of the counter Y. This value is an unsigned number and able to take the range of for example (0, 1, 2, 3, D). |
| Ystop | The stop value of the Y counter. The counter will fold over to the Ystart value to finish the length count. This value is an unsigned number and able to take the range of for example (0, 1, 2, 3, E). The Ystop value does not have to be greater the Ystart value. |
| Ylength | The length or stride value that the Y counter takes until it goes back to the last starting value plus the slip. This value is an unsigned number and able to take the range of for example (0, 1, 2, 3, F). |
| Ystep | The step value that the Y counter counts by. This value is a signed number and able to take the range of for example (−M, −3, −2, −1, 0, 1, 2, 3, N). This allows the Y counter to increment, decrement, or no count. |
| Yslip | The slip value is used in both slip modes and allows the counter to slip positively, slip negatively, or no slip. This value is a signed number and able to take the range of for example (−J, −3, −2, −1, 0, 1, 2, 3, K). |
| Yslip_after_Ylength_mode | This mode uses the previous start value plus slip to calculate the new start value after the Y counter length has occurred. |
| Yslip_after_Xstop_mode | This mode allows the slip register to be applied after Xstop is reached. This mode may be used for JPEG 2000 scanning. |
| Ycount_after_Xstop_mode | This mode allows the Y counter to count when the Xstop value has been detected and after the Xlength count is finished. |
| Ycount_after_Xlength_mode | This mode allows the Y counter to count when the Xlength count has occurred. |
| Offset | This value is added to the Xcounter and Ycounter values to produce a physical address to the memory. |

Y count after X stop mode: In this mode, the Y counter is held constant until the X stop value has been reached and the X length is satisfied. Then in the next count sequence, the Y count will increment by the Y step value as long as the Y stop and length has not been reached. In this mode, slip is not used just step, start, stop and length. Note that in this mode the length has to be satisfied as well and the stop value. It would be possible to hit the stop value many times until the length value is reached, and then the y counter would increment.

X count after Y stop mode: Same as Y count after X stop mode except that the X counter is held constant until the Y stop value has been reached and after the Y length has finished.

Slip after length mode: In this mode, the counter will slip after a determined length (number of increments) has occurred. The slip value is then added to the beginning of the count sequence until the length again has occurred. For example: start=1, step=1, slip=5 and length=3, then the count sequence would be (1, 2, 3) then adding slip of 5 (6, 7, 8) then adding slip of 5(11, 12, 13) and so on.

Slip after stop mode: The value of the slip will be added to the counter (X or Y) when the stop limit value is reached in (Y or X) respectively. Note that there is no Xslip after Xstop mode because after adding the slip value to X after an X stop value has been reached, the X counter may never reach the Xstop value again. So only Xslip after Ystop and Yslip after Xstop is defined.

Slip: is different then step. The step is the count value as the counter changes. For example, with a step of 1, start of 0, length of 6, slip of 0 and slip after length mode on, the counter will take the following values: (0, 1, 2, 3, 4, 5) then (0, 1, 2, 3, 4, 5) and on and on. If the step is 2, start of 0, length of 6 and slip of 0, the counter will take the following values: (0, 2, 4, 6, 8,10) then (0, 2, 4, 6, 8,10) and on and on. If a slip value of 1 is added, the counter will count as follows: With a step of 1, start of 0, length of 6 and a slip of 1, the counter will take the following values: (0, 1, 2, 3, 4, 5) then (1, 2, 3, 4, 5, 6) and on and on. If the step is 2, start of 0, length of 6 and slip of 2, the counter will take the following values: (0, 2, 4, 6, 8, 10) then (2, 4, 6, 8,10, 12) and so on. The slip value is an additional amount added to the counter after some condition has occurred such as length of counts being reached.

Control unit 202 receives control signals 210 from a processor instruction execution unit or other device. To provide direct access to the index value itself, the instruction can directly reference a counter as a source or destination register in the processor s instruction bit field. To facilitate task switching, X and Y counting control logic 204 and static control values may be read and written by the processor. The auto counting can also be controlled by an indirect reference of the counter as a source or destination register in the processors instruction bit field. Control unit 202 facilitates incrementing, decrementing, checking start and stop values, stepping X and Y counting control logic 204, implementing X and Y modes of scanning operation, and allowing reads and writes of registers, such as those shown in TABLE 1.

Figure 3:
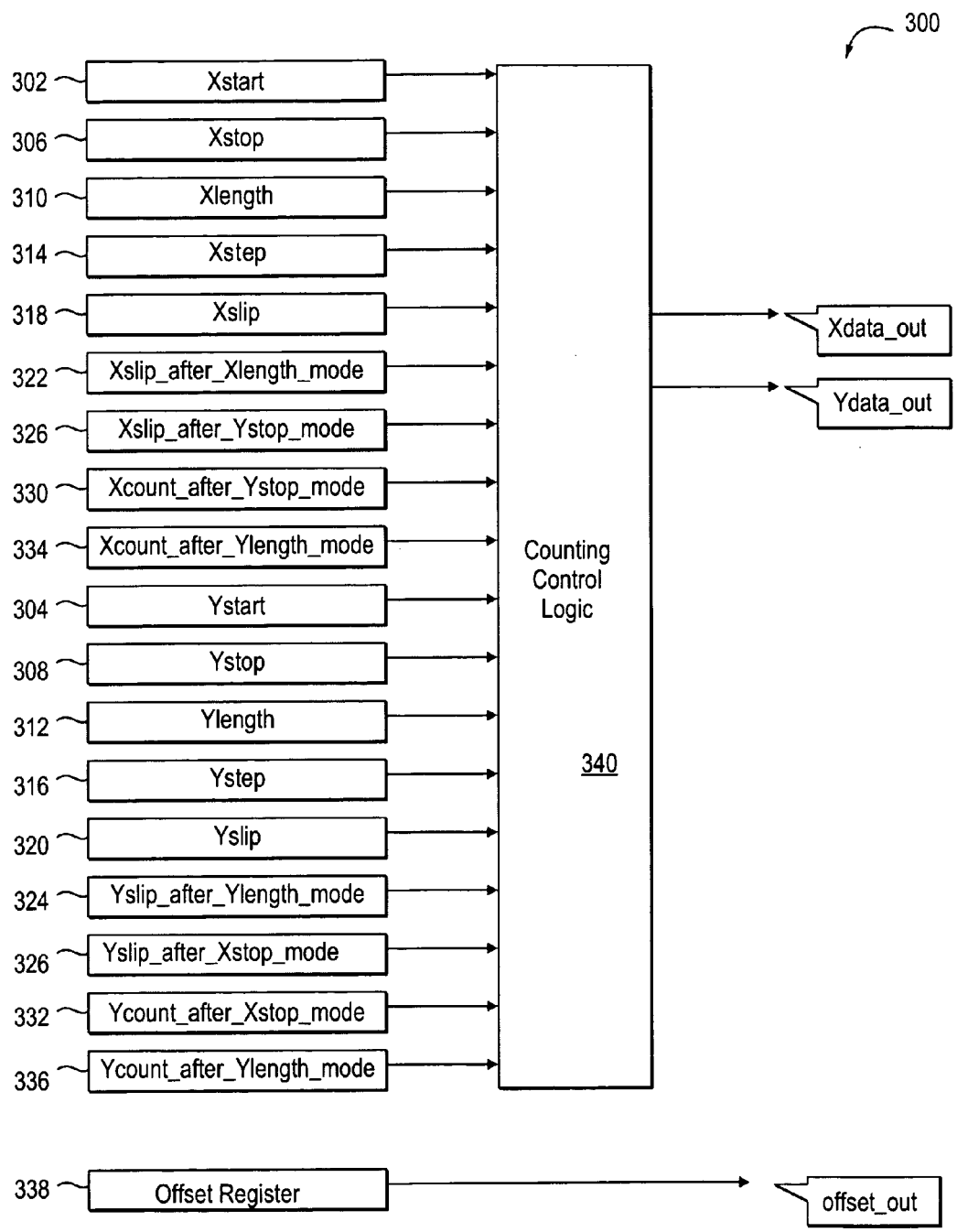
FIG. 3 illustrates a detailed diagram of an embodiment of the registers shown in FIG. 2.

FIG. 3 illustrates a detailed block diagram of an embodiment 300 of the registers 206 and 208 shown in FIG. 2 and described in TABLE 1. Auto incrementing, decrementing, or static modes of indexing can be implemented.

Start registers 302 and 304 store the start value of X and Y counting control logic 340 respectively. The start value is an unsigned number and able to take the range of for example, (0, 1, 2, 3, A).

Stop registers 306 and 308 store the stop value of X and Y counting control logic 340 respectively. A counter will fold over to a start value to finish the length count. The stop value is an unsigned number and able to take the range of for example (0, 1, 2, 3, B). The stop value does not have to be greater than the start value.

Length registers 310 and 312 store a length or stride value that the X and Y counting control logic 340 respectively takes until they go back to the last starting value plus the slip. The length value is an unsigned number and able to take the range of for example (0, 1, 2, 3, C).

Step registers 314 and 316 store a step value that the X and Y counting control logic 340 respectively counts by. This value is a signed number and able to take the range of for example (−M, −3, −2, −1, 0, 1, 2, 3, N). This allows the counter to increment, decrement, or no count and facilitates interleaved data. Skip counting supports interlaced data like RGB or YUV in 1D or 2D data memory space.

Slip registers 318 and 320 store a value for X and Y counting control logic 340 respectively. The value is signed number and able to take the range of for example (−J, −3, −2, −1, 0, 1, 2, 3, K). The value stored in slip registers 318 and 320 is used in slip modes described below and allows X and Y counting control logic 340 to slip positively, slip negatively, or no slip.

Various slip modes may be supported. Slip after length mode registers 322 and 324 allow activation of the slip after length modes for X and Y counting control logic 340 respectively. In this mode, the previous start value plus slip is used to calculate the new start value after the counter length has occurred. For example, in the Xslip after Xlength mode, the previous start value plus slip is used to calculate the new start value after the X counter length has occurred.

Slip after stop mode registers 326 and 328 allow activation of the slip after stop modes for X and Y counting control logic 340 respectively. In this mode, the slip register of a first counter is applied after the stop for the second counter is reached. For example, in the Xslip after Ystop mode, the slip register is applied after Ystop is reached. This mode maybe useful for JPEG 2000 scanning.

Various X and Y scanning modes may be supported. Count after stop mode registers 330 and 332 allow activation of the count after stop mode. In this mode, a first counter is used to trigger a second counter to count in response to a stop value being reached and after a length count has finished. For example, in the Ycount after Xstop mode, the Ycounter is allowed to count when the Xstop value has been detected and after the Xlength count is finished.

Count after length mode registers 334 and 336 allow activation of the count after length mode. In this mode, a first counter triggers a second counter in response to a length amount being counted. For example, in the Ycount after Xlength mode, the Y counter is allowed to count when the Xlength count has occurred.

Mode registers 322–336 may be enabled by activation of a bit or other method.

Offset register 338 stores an offset value that is added to the X and Y counter values to produce a physical address to memory.

In a typical implementation, 1D and 2D type scanning with interleaved data such as RGB involving different rows and columns are supported. The implementation is controlled in a 2D fashion but is actually implemented in actual memory space (i.e. in physical memory, 1D). In a typical implementation, an instruction is sent. The processor sets up one or more counters. In the instruction, the counter is used as a source and automatically retrieves the value. For example, values from the X and Y registers 206 and 208 are added with an offset value to form an actual address. Direct access to the index values are provided for generating filters coefficients. The index value points to actual memory. The output of the counter is used as the actual physical pointer. Thus instead of generating addresses for indexing, embodiments of the invention autogenerate each time it indexes or points or refers to the counter. By allowing read/write of index values, task switching is provided for.

Automatic generation of scanning patterns for standard 1D and 2D convolutional filter and many other applications including virtual 1D and 2D FIFO s in linear memory are supported. In particular, one instruction that indirectly uses the counter as a source or destination address could use a smaller loop with less instructions. Repeat instructions become more usable due to the fact that subsequent scanning data fetch instructions are binary exact allowing compression techniques to become possible.

Figure 4:
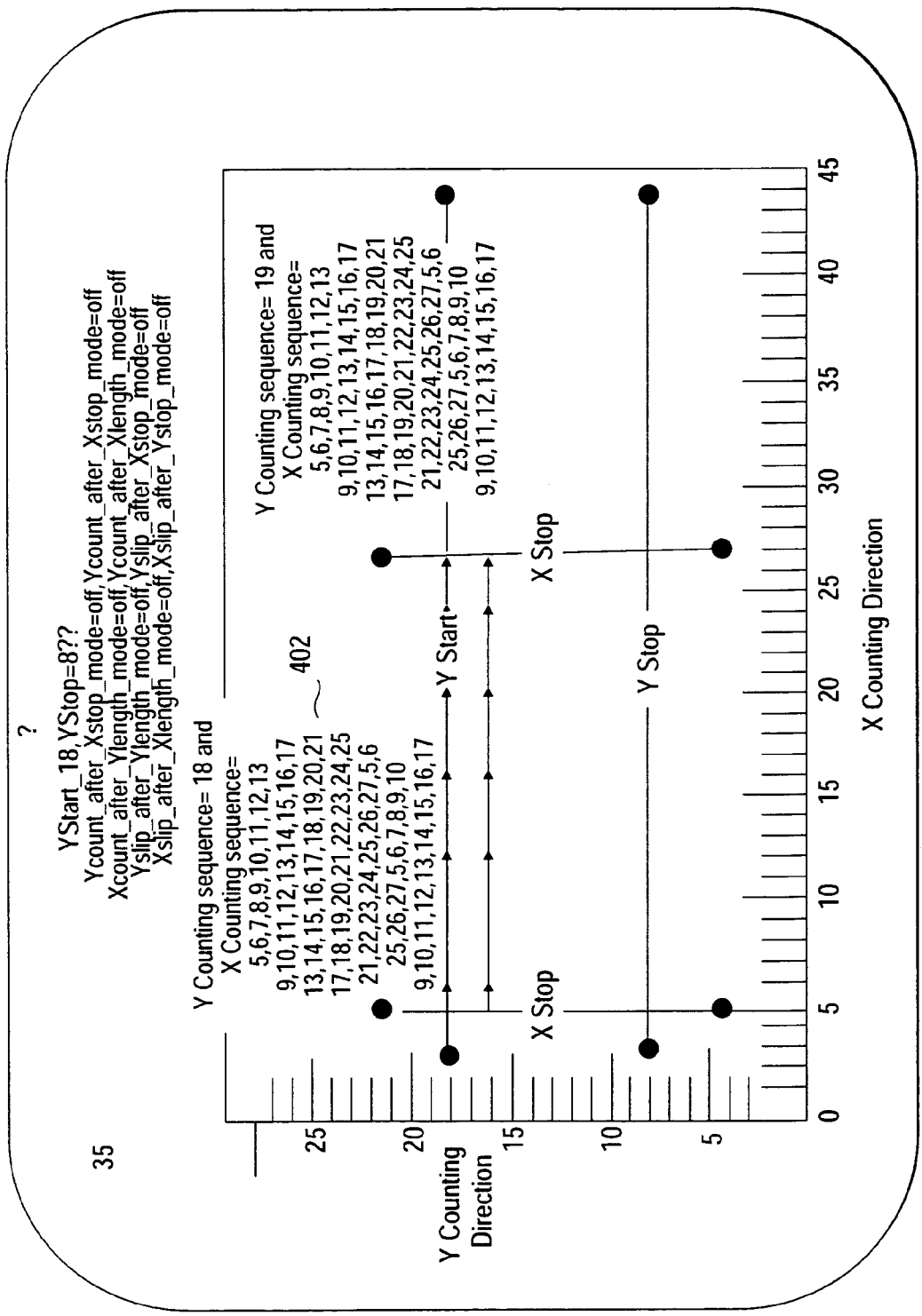
FIG. 4 illustrates an embodiment of an exemplary general scanning pattern and convolutional type filtering in two dimensions.

FIG. 4 illustrates an embodiment 400 of an exemplary general scanning pattern and convolutional type filtering in two dimensions. Values are programmed into the X and Y counters 206 and 208 (FIG. 2). Arrows 402 denote the counting sequence which, when shown in succession, depict Xslip.

A counting sequence with the counters in the Ycount after Xstop mode is shown. This mode allows the Y counter to count when the Xstop value has been detected and after the Xlength count is finished. The Ycount after Xstop mode mode may be enabled using one or more bits or method known to one skilled in the art. In the implementation shown, the Y counter starts at 18 and stays at 18 until the X counter reaches Xstop and finishes the length count. Once the X counter has completed the length count, the Y counter decrements by −2 to 16.

The X counter starts at 5 (Xstart=5) and counts with a step of +1 (Xstep=1) until the Xlength of 9 addresses (Xlength=9) is outputted. After the X counting sequence reaches 13 (Xlength=9), it slips forward 4 counts (Xslip=4) to 9.

At this point the X count slips its start count by 4, starting at 9. The X counter starts at 9 and counts with a step of +1 until the length of 9 addresses is outputted. Step and slip values can be negative as well as positive, but the start, stop, and length are positive. After the X counting sequence reaches 17 (Xlength=9), it slips back 4 counts (Xslip=4) to 13.

The counting sequence continues until Xstop is reached at which point the sequence wraps around. For example, when Xstop of 27 is reached, the counting sequence returns to Xstart, in this case 5. This provides an auto indexing capability for building and managing 1D or 2D circular FIFO s in data memory space. To support circular FIFO operation, both counters will wrap around from start to stop values that are programmed.

Figure 5:
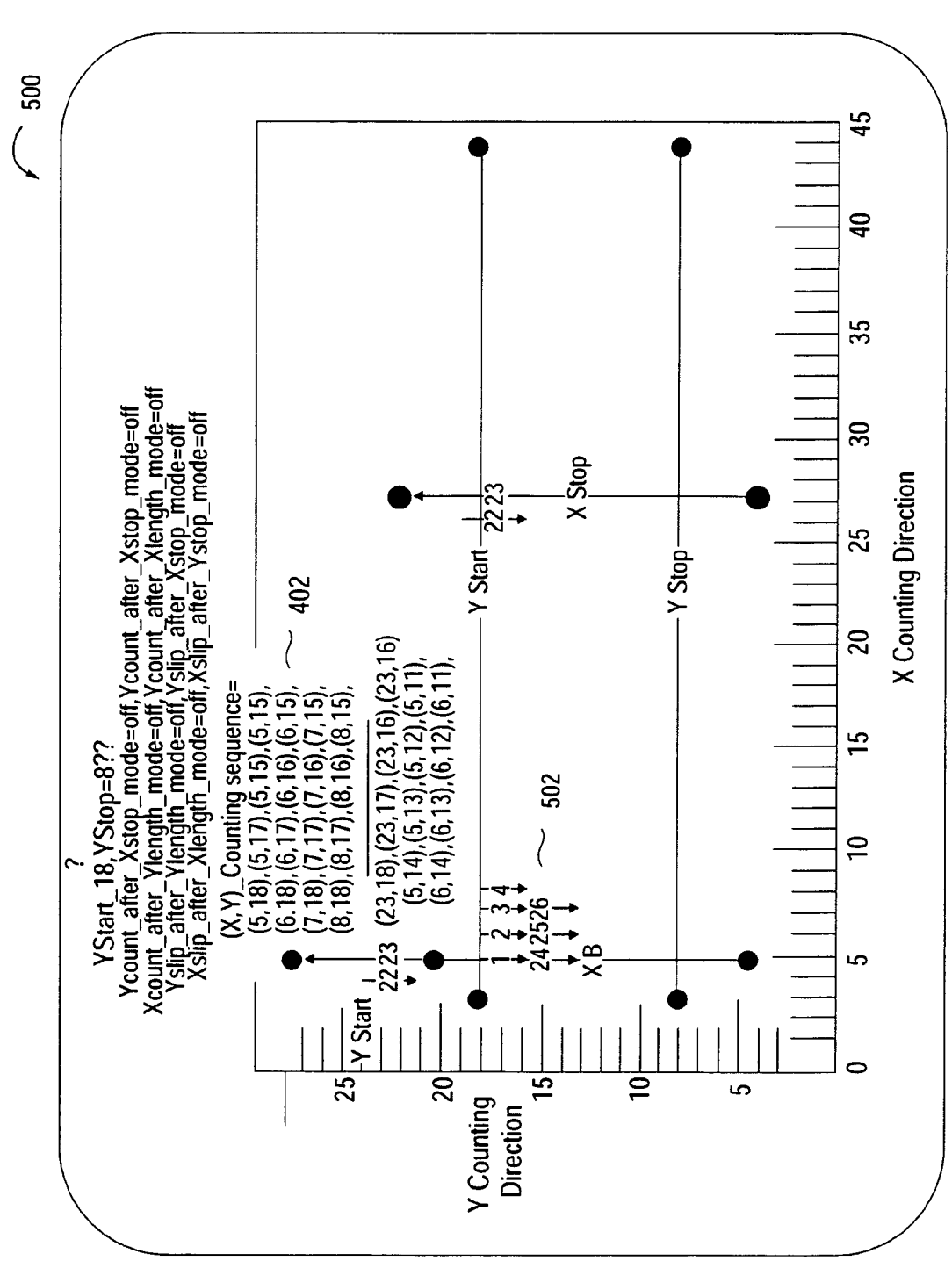
FIG. 5 illustrates an embodiment of a counting sequence for scanning JPEG 2000 images for bit plane coding.

FIG. 5 illustrates an embodiment 500 of a counting sequence for scanning JPEG 2000 images for bit plane coding. The JPEG 2000 standard divides a digital image into code blocks after 2D discrete wavelet transform is applied. In particular, the whole image is divided into one or more image tile components, each of which are then 2-D discrete wavelet transformed. The transform coefficients of each image tile component are then grouped into sub bands. The sub bands are partitioned into rectangular code blocks. Each code block is then entropy encoded.

Each bit-plane of a code block is scanned in a particular order. Starting at the top left, the first four bit symbols of the column are scanned. The first four bit symbols of the second column are then scanned until the width of the code-block has been covered. Then the second four bit symbols of the first column are scanned and so on. A similar scan is continued for any leftover rows on the lowest code blocks in the sub-band. The scanning is performed in consecutive strips of four rows. The code block is not limited to an 8.times.8 block and larger code blocks are envisaged, such as a 32.times.32 block or a 64.times.64 code block. In the latter case, there will 16 consecutive strips of four rows.

The arrows 502 indicate the JPEG 2000 counting sequence. The scanning reads 4 pixels down (Ystep=−1, Ylength=4), and then scans the next column of 4 down and so on. For example, in the example, Xstart=5, Xstop=27, Xstep=1, Xslip=0 and Xlength=23, Ystart=18, Ystop=8, Ystep=−1, Yslip=−4, Y length=4, Xcount after Ylength mode on and Yslip after Xstop mode on. The (X,Y) counting sequence may be as follows:

1: (5,18), (5,17), (5,16), (5,15)
2: (6,18), (6,17), (6,16), (6,15)
3: (7,18), (7,17), (7,16), (7,15)
4: (8,18), (8,17), (8,16), (8,15)
. . .
23: (27,18), (27,17), (27,16), (27,15)

When the end of the vertical scan is reached (X stop=27) the next 4 rows are scanned down from left to right:

24: (5,14), (5, 13), (5, 12), (5, 11)
25: (6,14), (6, 13), (6, 12), (6, 11)
. . .
46: (27, 14), (27, 13), (27, 12), (27, 11)

Each time the Ylength is reached (4) the X count is incremented, this produces the vertical down scan of 4. This continues until the XStop is reached and then the Yslip is added to the Ycounter to allow scanning the next 4 rows down from left to right.

Figure 6:
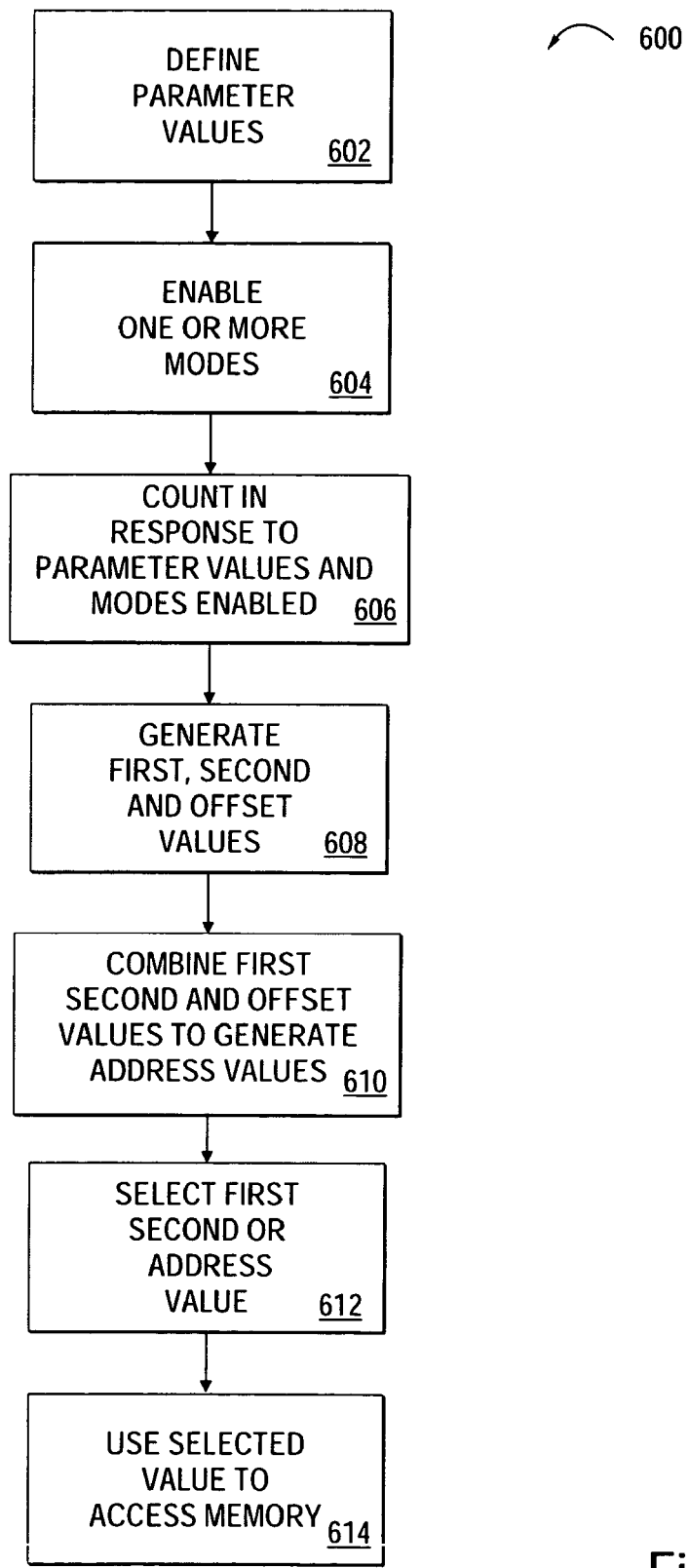
FIG. 6 illustrates an embodiment of a flow chart for generating an address sequence to memory.

FIG. 6 illustrates a flow chart of an embodiment 600 to generate an address sequence to memory.

In particular, in step 602, parameter values are defined including start and stop values. The parameter values may include, but are not limited to:
first and second start and stop values
first and second length values for first and second counters to take until they go back to the last starting value plus the slip
first and second step values for the first and second counters to count by
first and second slip values for the first and second counters to count by.
offset value that is added to the first and second counter values to produce a physical address to memory.

In step 604, one or more modes are enabled. The modes may include, but are not limited to:
first or second slip after length modes to allow activation of the slip after length modes for first or second counters. A previous start value plus slip is used to calculate the new start value after the counter length has occurred.
first or second slip after stop modes to allow activation of the slip after stop modes for first or second counters. A slip value is applied after the counter stop is reached. This mode is useful for JPEG 2000 scanning.
first or second count after stop modes to allow activation of the count after stop mode. A first counter is used to trigger a second counter to count in response to a stop value being reached and after a length count has finished.
first or second count after length mode registers to allow activation of the count after length mode. A first counter is used to trigger a second counter in response to a length amount being counted.

In step 606, counting proceeds in response to parameter values and modes enabled. This includes indexing in a first and second direction (for example, X and Y) in memory.

In step 608, first, second and offset values are generated.

In step 610, first, second and offset values are combined to generate an address value.

In step 612, a first value, second value or address value is selected.

In step 614, the selected value is used to directly or indirectly access memory. In particular, the selected first value, second value or address value is applied to the memory as a source or destination address for memory load and stores.

The above description of illustrated embodiments of the invention is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. Embodiments of the invention may be implemented in digital signal processors as well as standard processors because of the capabilities it provides for processing applications such as JPEG2000 as well as existing applications such as JPEG. These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An address generator that generates an address sequence directly to memory, comprising:
   a control unit including a plurality of counters that count between predefined start and stop values and generates first, second and offset values;
   an adder to combine the first, second and offset values and generate an address value; and
   a multiplexer to receive a first value, second value and address value and select an output value to the memory.

2. The address generator claimed in claim 1, wherein the plurality of counters comprise:
   a first counter that indexes in a first direction in the memory; and
   a second counter that indexes in a second direction in the memory.

3. The address generator claimed in claim 2, wherein the control unit further comprises:
   first and second start registers that store the start values for the first and second counters.

4. The address generator claimed in claim 3, wherein the control unit further comprises:
   first and second stop registers that store the stop values for the first and second counters.

5. The address generator claimed in claim 4, wherein the control unit further comprises:
   first and second length registers that store the length values for the first and second counters to take until they go back to a last starting value plus a slip.

6. The address generator claimed in claim 5, wherein the control unit further comprises:
   first and second step registers that store step values for the first and second counters to count by.

7. The address generator claimed in claim 6, wherein the control unit further comprises:
   first and second slip registers that store the slip values for the first and second counters to count by.

8. The address generator claimed in claim 7, wherein the control unit further comprises:
   first and second slip after length mode registers to allow activation of slip after length modes for first and second counters.

9. The address generator claimed in claim 8, wherein in the slip after length mode, the previous start value plus the slip is used to calculate a new start value after a counter length has occurred.

10. The address generator claimed in claim 9, wherein the control unit further comprises:
    first and second slip after stop mode registers to allow activation of the slip after stop modes for first and second counters.

11. The address generator claimed in claim 10, wherein in the slip after stop mode, a slip register is applied after a counter stop is reached.

12. The address generator claimed in claim 11, wherein the slip after stop mode is used for JPEG 2000 scanning.

13. The address generator claimed in claim 11, wherein the control unit further comprises:
    first and second count after stop mode registers to allow activation of a count after stop mode.

14. The address generator claimed in claim 13, wherein in the count after stop mode, the first counter is used to trigger the second counter to count in response to the stop value being reached and after the length count has finished.

15. The address generator claimed in claim 14, wherein the control unit further comprises:
    first and second count after length mode registers to allow activation of a count after length mode.

16. The address generator claimed in claim 15, wherein in the count after length mode, the first counter triggers the second counter in response to the length amount being counted.

17. The address generator claimed in claim 16, wherein the control unit further comprises:
    an offset register that stores the offset value that is added to the first and second counter values to produce a physical address to memory.

18. The address generator claimed in claim 1, wherein the selected first value, second value or address value is applied to the memory as a source or destination address for memory load and stores.

19. The address generator claimed in claim 1, wherein the address generator receives control from a processor s instruction that directly and indirectly indexed causes the selected first value, second value or address value to be applied to the memory as a source or destination address for memory load and stores.

20. A method for generating an address sequence to memory, comprising:
    defining parameter values including start and stop values;
    counting between predefined start and stop values;
    generating first, second and offset values;
    combining the first, second and offset values and generating an address value;
    selecting a first value, second value or address value; and
    using the selected value to directly or indirectly access the memory.

21. The method claimed in claim 20, wherein counting between predefined start and stop values further comprises:
    indexing in a first direction in the memory; and
    indexing in a second direction in the memory.

22. The method claimed in claim 21, wherein defining parameter values including start and stop values further comprises:
    accessing X and Y start values.

23. The method claimed in claim 22, wherein defining parameter values including start and stop values the further comprises:
    accessing X and Y stop values.

24. The method claimed in claim 23, wherein defining parameter values including start and stop values further comprises:
    accessing first and second length values for first and second counters to take until they go back to a last starting value plus a slip.

25. The method claimed in claim 24, wherein defining parameter values including start and stop values further comprises:
    accessing first and second step values for the first and second counters to count by.

26. The method claimed in claim 25, wherein defining parameter values including start and stop values further comprises:
    accessing first and second slip values for the first and second counters to count by.

27. The method claimed in claim 20, wherein defining parameter values including start and stop values further comprises:
    enabling first or second slip after length modes to allow activation of slip after length modes for first or second counters.

28. The method claimed in claim 27, wherein enabling first or second slip after length modes to allow activation of slip after length modes for first or second counters further comprises:
using a previous start value plus the slip to calculate a new start value after a counter length has occurred.

29. The method claimed in claim 28, wherein defining parameter values including start and stop values further comprises:
enabling first or second slip after stop modes to allow activation of the slip after stop modes for first or second counters.

30. The method claimed in claim 29, wherein enabling first or second slip after stop modes to allow activation of the slip after stop modes for first or second counters further comprises:
applying the slip value after the counter stop is reached.

31. The method claimed in claim 30, further comprising: enabling the slip after stop mode for JPEG 2000 scanning.

32. The method claimed in claim 30, wherein defining parameter values including start and stop values further comprises:
enabling first or second count after stop modes to allow activation of a count after stop mode.

33. The method claimed in claim 32, wherein enabling first or second count after stop modes to allow activation of the count after stop mode further comprises:
using the first counter to trigger the second counter to count in response to the stop value being reached and after the length count has finished.

34. The method claimed in claim 33, wherein defining parameter values including start and stop values further comprises:
enabling first or second count after length mode registers to allow activation of a count after length mode.

35. The method claimed in claim 34, wherein enabling first or second count after length mode registers to allow activation of the count after length mode further comprises:
using the first counter to trigger the second counter in response to a length amount being counted.

36. The method claimed in claim 35, wherein defining parameter values including start and stop values further comprises:
accessing the offset value that is added to the first and second counter values to produce a physical address to the memory.

37. The method claimed in claim 20, further comprising:
applying the selected first value, second value or address value to the memory as a source or destination address for memory load and stores.

38. The method claimed in claim 20, further comprising:
receiving control from a processor's instruction that directly and indirectly indexed causes the selected first value, second value or address value to be applied to the memory as a source or destination address for memory load and stores.

39. A system, comprising:
a memory;
a control unit including a plurality of counters that count between predefined start and stop values and generates first, second and offset values;
an adder to combine the first, second and offset values and generate an address value; and
a multiplexer to receive a first value, second value and address value and select an output value to the memory, the output value comprises an address sequence directly to the memory.

40. The system claimed in claim 39, wherein the plurality of counters comprise:
a first counter that indexes in a first direction in the memory; and
a second counter that indexes in a second direction in the memory.

41. The system claimed in claim 40, wherein the control unit further comprises:
first and second start registers that store the start values for the first and second counters;
first and second stop registers that store the stop values for the first and second counters;
first and second length registers that store length values for the first and second counters to take until they go back to a last starting value plus a slip;
first and second step registers that store step values for the first and second counters to count by;
first and second slip registers that store the slip values for the first and second counters to count by; and
an offset register that stores the offset value that is added to the first and second counter values to produce a physical address to memory.

42. The system claimed in claim 41, wherein the control unit further comprises:
first and second slip after length mode registers to allow activation of slip after length modes for first and second counters;
first and second slip after stop mode registers to allow activation of the slip after stop modes for first and second counters;
first and second count after stop mode registers to allow activation of the count after stop mode; and
first and second count after length mode registers to allow activation of a count after length mode.

43. The system claimed in claim 42, wherein the selected first value, second value or address value is applied to the memory as a source or destination address for memory load and stores.

44. The system claimed in claim 43, wherein the system receives control from a processor's instruction that directly and indirectly indexed causes the selected first value, second value or address value to be applied to the memory as a source or destination address for memory load and stores.

* * * * *